United States Patent
Irwin et al.

(10) Patent No.: US 7,083,132 B2
(45) Date of Patent: Aug. 1, 2006

(54) COMMINUTING APPARATUS WITH MULTIPLE ENTRANCE OPENINGS

(75) Inventors: Jere F. Irwin, P.O. Box 10668, Yakima, WA (US) 98909-1668; John E. Fitzpatrick, Yakima, WA (US); Bruce E. Crawford, Yakima, WA (US)

(73) Assignee: Jere F. Irwin, Yakima, WA (US)

( * ) Notice: Subject to any disclaimer, the term of this patent is extended or adjusted under 35 U.S.C. 154(b) by 83 days.

(21) Appl. No.: 10/672,528

(22) Filed: Sep. 26, 2003

(65) Prior Publication Data

US 2005/0067516 A1    Mar. 31, 2005

(51) Int. Cl.
*B02C 18/22* (2006.01)

(52) U.S. Cl. ...................... 241/224; 241/236
(58) Field of Classification Search ............... 241/236, 241/224
See application file for complete search history.

(56) References Cited

U.S. PATENT DOCUMENTS

| 5,893,523 | A  | * | 4/1999  | Irwin  | 241/60 |
| 6,550,701 | B1 | * | 4/2003  | Chang  | 241/36 |
| 6,644,573 | B1 |   | 11/2003 | Irwin  |        |

FOREIGN PATENT DOCUMENTS

DE       3633109     *   3/1998

OTHER PUBLICATIONS

U.S. Appl. No. 09/686,714, filed Oct. 10, 2000, Irwin.

* cited by examiner

*Primary Examiner*—Mark Rosenbaum
(74) *Attorney, Agent, or Firm*—Wells St. John P.S.

(57) ABSTRACT

A comminuting device is provided having a support structure, a set of intermeshing scissor rolls, at least two entrance openings, and a bulkhead. The support structure has an enclosure. The set of intermeshing scissor rolls are rotatably carried by the support structure. The at least two entrance openings are provided in the enclosure. The bulkhead is interposed between a first one of the entrance openings and a second one of the entrance openings. The bulkhead provides a first entrance shoot and a second entrance shoot, with the bulkhead including a mouth portion configured to transfer scrap products between the first entrance shoot and the second entrance shoot.

27 Claims, 7 Drawing Sheets

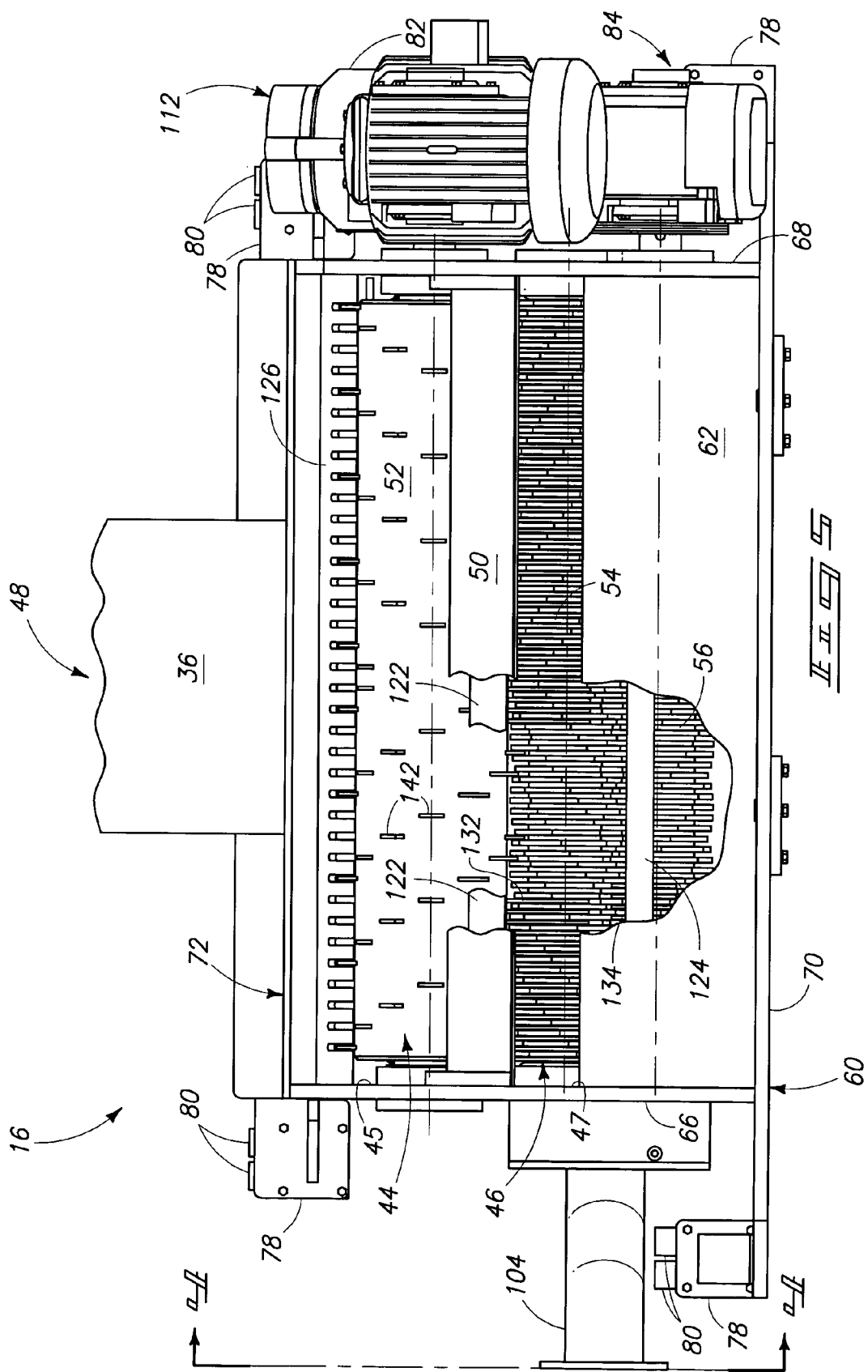

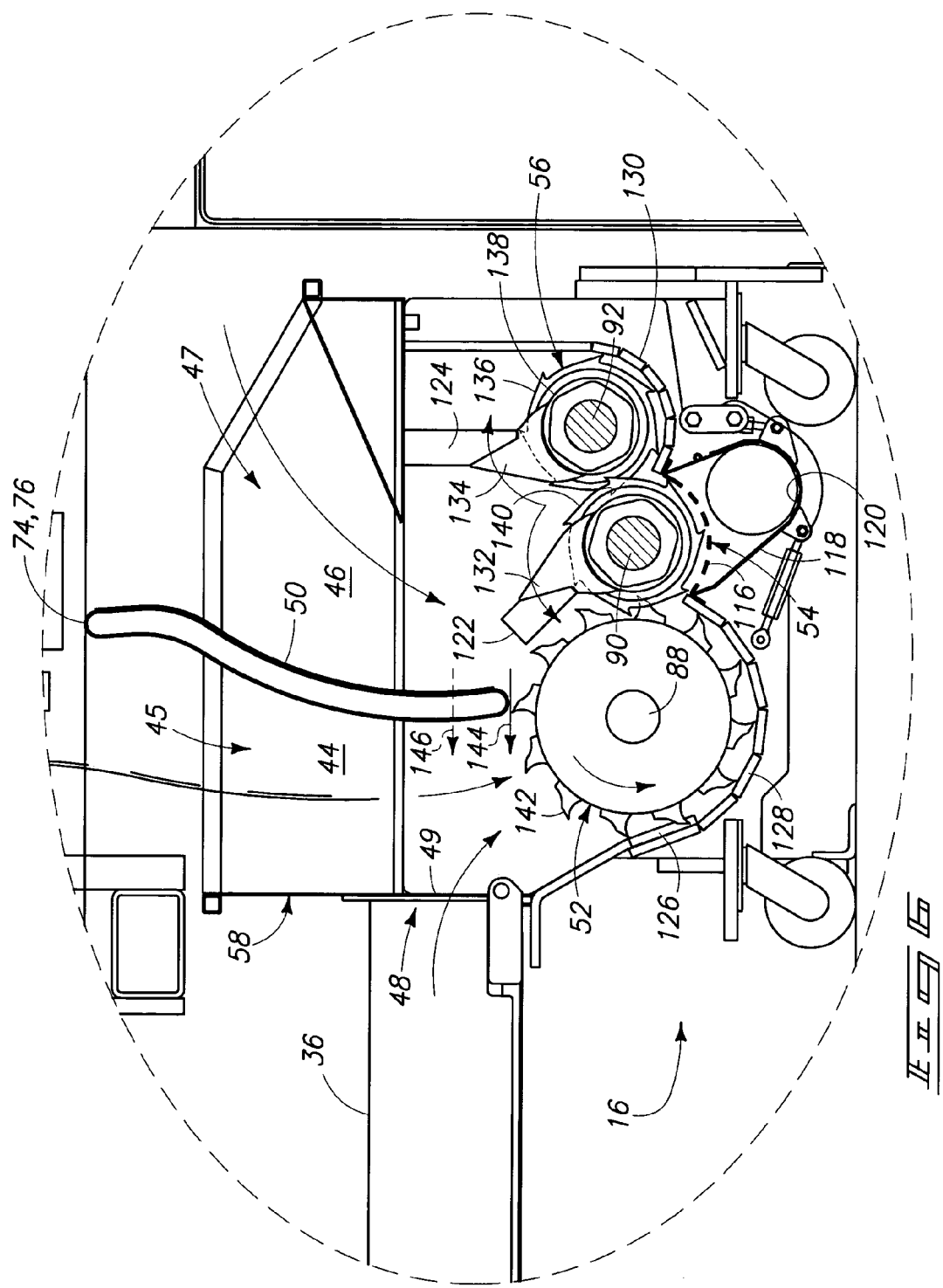

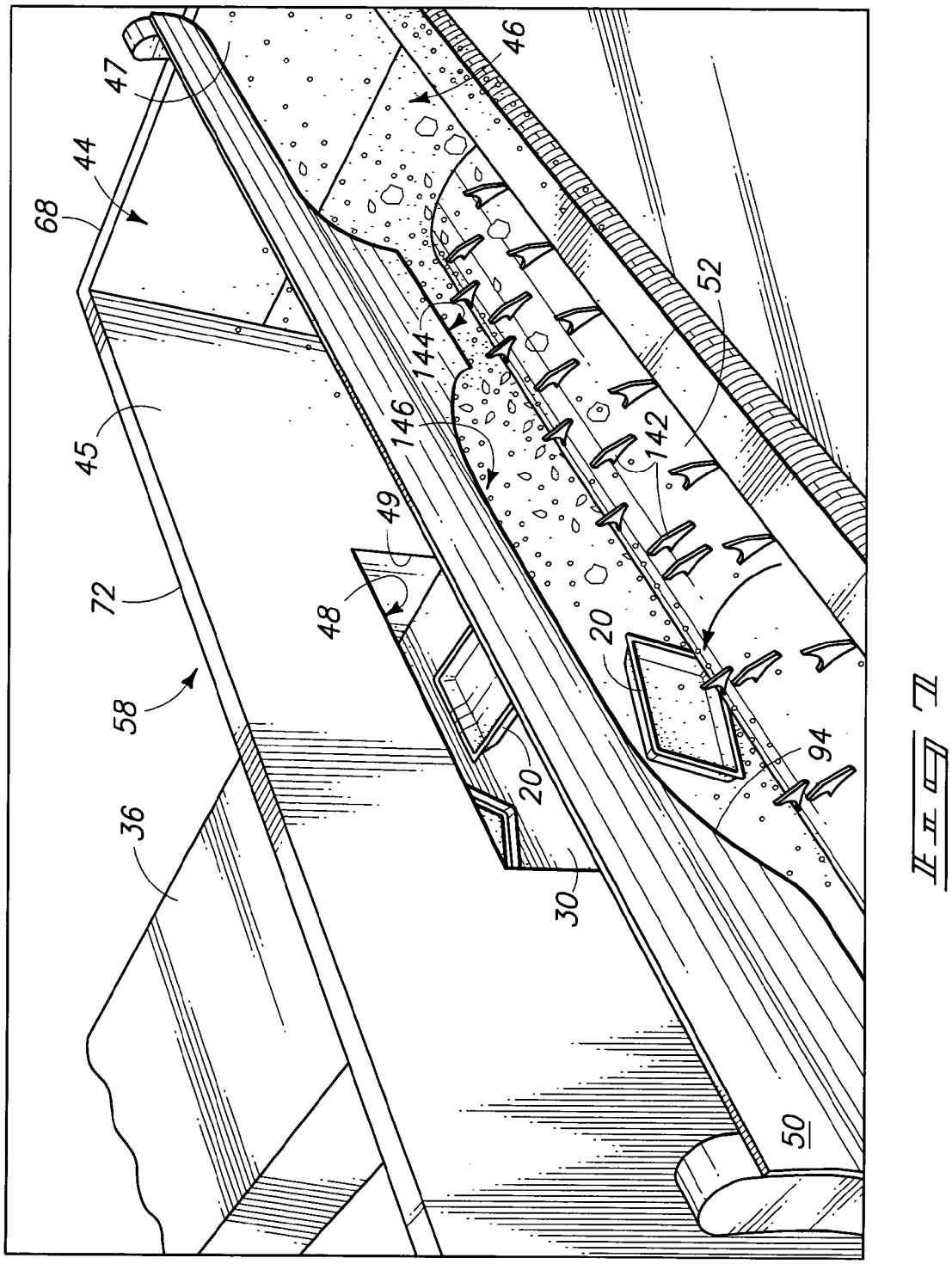

őt # COMMINUTING APPARATUS WITH MULTIPLE ENTRANCE OPENINGS

TECHNICAL FIELD

The present invention pertains to apparatus and methods for subdividing waste materials. More particularly, the present invention relates to apparatus and methods for comminuting solid waste materials, such as plastic sheet material.

BACKGROUND OF THE INVENTION

Automated manufacturing systems that produce plastic articles have advanced to the point that they now generate significant amounts of plastic waste material at increasing rates. Other manufacturing and recycling systems also produce significant amounts of solid waste material, including plastic waste material. Many apparatus are known for comminuting waste material, such as plastic sheet material, into small, rather uniform particles or pieces that can be readily recycled or disposed of in an environmentally acceptable manner. For example, thermoforming machines mold articles that are heat formed from a sheet or web of plastic material as a pair of mating two-piece dies or molds impart an article geometry into a heated sheet of thermoformable plastic material to achieve a desired final shape. A typical thermoforming machine includes pairs of mating male and female dies, or molds, that are brought together on opposed sides of a preheated web of plastic material, during an operating cycle. The web of plastic material, including the formed articles, is then processed in a trim press where the articles are severed and removed from the web, leaving a skeleton web that is subsequently recycled in a comminuting apparatus.

U.S. Pat. No. 5,893,523 discloses one comminuting apparatus suitable for use in recycling a skeleton web of scrap material that is generated from a thermoforming machine and trim press of a thermoforming line. The comminuting apparatus includes a first material entrance and a second material entrance through which solid waste material is fed into the comminuting apparatus. The first material entrance is configured to receive a skeleton of plastic sheet material, whereas the second material entrance is configured to receive pieces of scrap and start-up formed web material that are typically hand-fed by an operator.

However, it is oftentimes difficult to hand-feed scrap and start-up material into the second material entrance, particularly when the comminuting apparatus is configured beneath a horizontal trim press where there is not a significant amount of clearance room. Additionally, the simultaneous delivery of waste material into two entrances can reduce efficiency by interfering with delivery of waste material at line speed from a trim press. Furthermore, the provision of such a comminuting apparatus beneath a horizontal trim press prevents operators from reaching the comminuting apparatus because typically such a configuration is shielded from operator interaction to prevent injuries and/or death. Accordingly, improvements are needed to enhance the ability to feed start-up and scrap material into a comminuting device while it is simultaneously configured for use in comminuting a skeleton web of plastic scrap material that exits a trim press.

SUMMARY OF THE INVENTION

A comminuting apparatus is provided with a structural divider that subdivides an interior of the comminuting apparatus. At least two separate entrance openings communicate with the subdivided interior of the comminuting device. In one case, at least three entrance openings are provided in a comminuting device with each entrance opening configured to deliver solid material into the enclosure for shredding within the machine.

According to one aspect, a comminuting device is provided having a support structure, a set of intermeshing scissor rolls, at least two entrance openings, and a bulkhead. The support structure has an enclosure. The set of intermeshing scissor rolls are rotatably carried by the support structure. The at least two entrance openings are provided in the enclosure. The bulkhead is interposed between a first one of the entrance openings and a second one of the entrance openings. The bulkhead provides a first entrance shoot and a second entrance shoot, with the bulkhead including a mouth portion configured to transfer scrap products between the first entrance shoot and the second entrance shoot.

According to another aspect, a plastic shredding machine includes a frame, at least two intermeshing scissor rolls, and at least three entrance openings. The frame has an enclosure. The at least two intermeshing scissor rolls are rotatably carried by the frame. The at least three entrance openings are provided in the enclosure. Each of the three entrance openings is configured to deliver plastic into the enclosure for shredding between the scissor rolls.

BRIEF DESCRIPTION OF THE DRAWINGS

Preferred embodiments of the invention are described below with reference to the following accompanying drawings.

FIG. 5 is a plan view of the comminuting apparatus of FIGS. 1–4 with a top portion broken away to show scissor rolls and a feed roll, and further depicting provision of multiple entrance openings.

FIG. 6 is a further enlarged transverse vertical cross-sectional view taken along line 6—6 of FIG. 2 and illustrating the interior of the comminuting apparatus.

FIG. 7 is an enlarged partial isometric view taken from above and to the right of the view depicted in FIG. 4 to illustrate orientation and configuration of three individual entrance chutes for the comminuting apparatus.

DETAILED DESCRIPTION OF THE PREFERRED EMBODIMENTS

Figure 1:
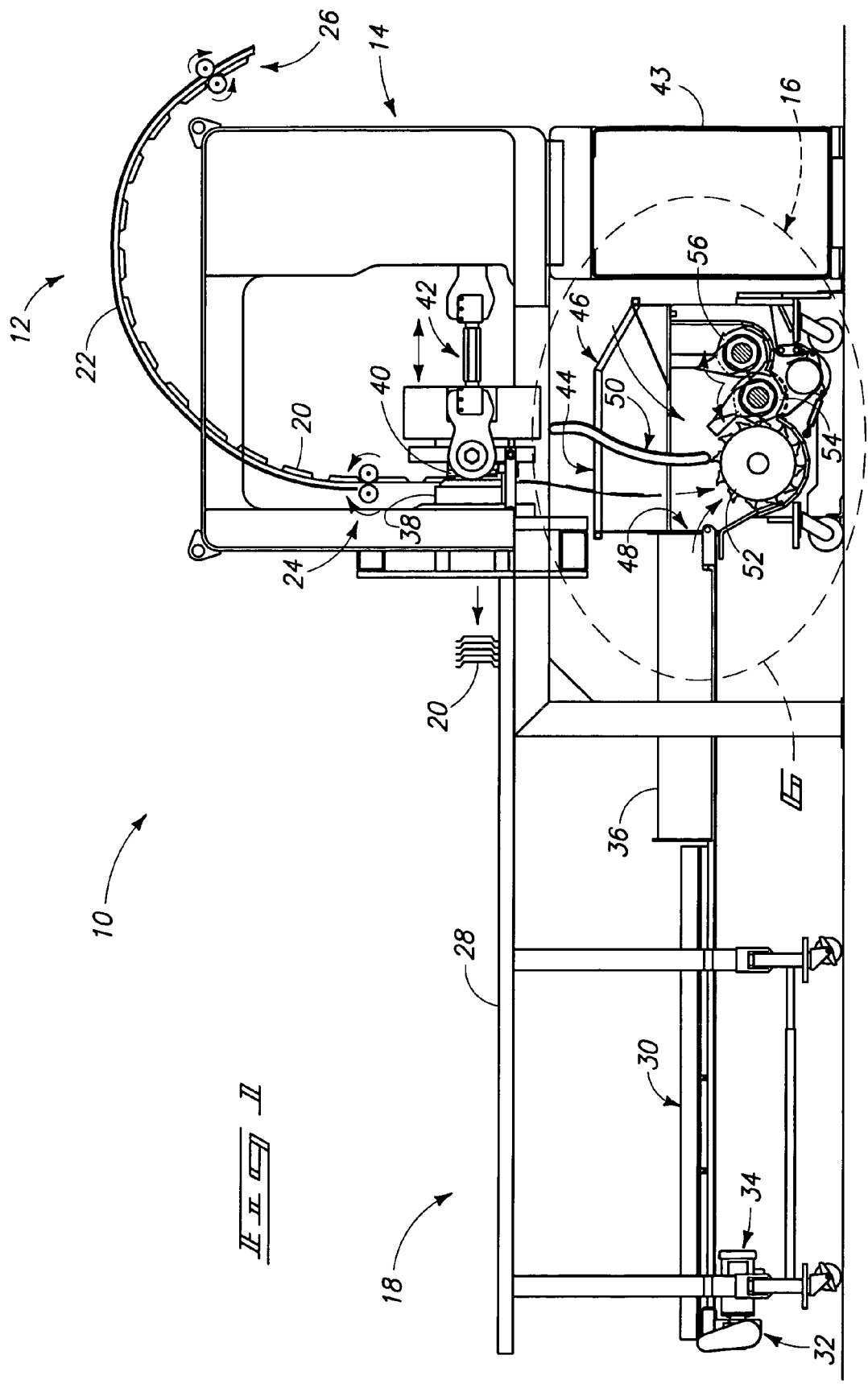
FIG. 1 is a vertical side view of a thermoforming trim system of a thermoforming line including a canopy, a trim press, a packaging table, and a comminuting apparatus, with the comminuting apparatus taken in partial vertical sectional view in accordance with one embodiment of the present invention.

This disclosure of the invention is submitted in furtherance of the constitutional purposes of the U.S. Patent Laws "to promote the progress of science and useful arts" (Article 1, Section 8).

Reference will now be made to a preferred embodiment of Applicants' invention. An exemplary implementation is described below and depicted with reference to the drawings comprising a solid waste comminuting apparatus shown in one exemplary size and configuration. While the invention is described by way of this one embodiment, it is understood that the description is not intended to limit the invention to such embodiment, but is intended to cover alternatives, equivalents, and modifications which may be broader than the embodiments, but which are included within the scope of the appended claims.

In an effort to prevent obscuring the invention at hand, only details germane to implementing the invention will be described in great detail, with presently understood peripheral details being incorporated by reference, as needed, as being presently understood in the art.

According to a preferred embodiment of the present invention, a solid waste comminuting apparatus is generally designated with reference numeral 16 in FIGS. 1–7. Comminuting apparatus 16 is provided within a thermoforming trim system 10 that forms a downstream portion of a thermoforming line (not shown) in which individual articles are heat formed within a sheet, or web, 22 of thermoformable plastic material. Comminuting apparatus 16 includes design improvements that enable delivery of solid waste material from multiple locations during a thermoforming operation.

As shown in FIG. 1, comminuting apparatus 16 is positioned at a downstream end of a thermoforming operation, beneath a thermoforming trim press 14. Trim press 14 receives a web 22 having thermoformed articles 20 contained therein which are delivered by way of a canopy 12 into trim press 14 for severing and separation of articles 20 from web 22. Articles 20 are then ejected toward a packaging table 18 where they are reviewed by an operator to identify any rejected products.

Trim press 14 includes a plurality of female dies 38 and male dies 40 that coact to sever articles 20 from web 22. More particularly, pairs of kinematic linkages 42 move a platen with male dies 40 toward and away from female dies 38 during such severing operation. Such a trim press 14 further includes a treadle system (not shown) that accurately conveys, guides and locates articles 20 relative to dies 38 and 40. Additionally, canopy 12 includes an overhead conveyor system that includes a servo pick assembly 24 and a servo helper assembly 26 that cooperate along opposite edges of web 22 to move web 22 and articles 20 into position for trimming between dies 38 and 40. Further details of the canopy and treadle of trim press 14 are disclosed in U.S. patent application Ser. No. 09/686,714, entitled "Apparatus for Conveying, Guiding and Locating a Thermoformable Web", filed Oct. 10, 2000, by inventor Jere F. Irwin, now U.S. Pat. No. 6,843,156, which is herein incorporated by reference.

In operation, servo motors are used to drive trim press 14 as well as the conveyor of canopy 12 such that primary servo drive 24 cooperates with secondary servo drive 26 to deliver articles 20 accurately between dies 38 and 40, whereas servo motors drive a platen on which female dies 38 are mounted for timely and accurately severing articles 20 from web 22.

After being severed from a web, articles 20 are successively stacked and accumulated onto a table surface 28 of packaging table 18. An operator can then inspect individual articles 20 to identify inferior quality products that are determined to be "rejected" products. An operator can then hand remove such "rejected" products and place such products onto a scrap conveyor 30. Scrap conveyor 30 is driven via a transfer case using a constant-speed drive motor 34. A conveyor belt (not shown) on drive and idler rollers extends into a conveyor cover 36 to deliver such "rejected" product back into comminuting apparatus 16 by way of a product entrance chute 48 that communicates with conveyor cover 36.

Concurrently, or alternately, a skeleton web (a web with articles removed) 22 is then delivered into comminuting apparatus 16 by way of skeleton web entrance chute 44. Also concurrently or alternately, additional product can be received into a start-up formed web entrance chute 46 that enables entry of start-up formed web (including articles) for delivery directly from a thermoforming machine at start-up or when an imperfection is detected in the forming operation. In this manner, the start-up formed web does not pass through canopy 12 and trim press 14, but instead passes directly into comminuting apparatus 16, underneath trim press 14 and above a ballast tank 43.

Trim press 14 is affixed atop ballast tank 43 to stabilize trim press 14. Ballast tank 43 is preferably filled with gravel or weighted material and attaches to a frame that supports trim press 14. Ballast tank 43 acts to stabilize thermoforming trim system 10 and reduce or minimize any vibration or movement of the trim press during operation. Additionally, used lubricating oil can be accumulated within ballast tank 43 as it is generated during a thermoforming operation from lubrication of components that are in motion.

As shown in FIG. 1, comminuting apparatus 16 is provided with three distinct entrance chutes (or ducts); namely, skeleton web entrance chute 44, start-up formed web entrance chute 46, and rejected product entrance chute 48. In order to enable concurrent (as well as alternate) feeding of solid waste material into apparatus 16, it was discovered that a divider plate, or bulkhead, 50 was advantageous in order to reduce clogging and misfeeding when providing scrap web and articles for comminuting within comminuting apparatus 16.

As shown in FIG. 7, entrance opening 45 in general enclosure 58 communicates with skeleton web entrance chute (or duct) 44. Chute 44 is provided between back wall 72, bulkhead 50, and side walls 66 (see FIG. 2) and 68.

Entrance opening 47 is provided in general enclosure 58 to communicate with start-up formed web entrance chute 46. Chute 46 is provided between bulkhead 50, cross-member 124 along with front wall 70, and side walls 66 (see FIG. 2) and 68. A bottom edge of bulkhead 50 and mouth 94 cooperate to provide communication passages 144 and 146, respectively. As start-up formed web is delivered into entrance opening 47, the web moves downwardly in chute 46 until engaging with fingers 142 of feed roll 52. The formed web is drawn via passages 144 and 146 outwardly along feed roll 52, downwardly along an outer edge of feed roll 52, and beneath feed roll 52 for delivery and severing between the pair of scissor rolls (see FIG. 6).

Entrance opening 49 is provided in general enclosure 58 which enables communication of rejected article chute (or duct) 48 with chutes 44 and 46. Mouth 94 enables individual articles 20 (as shown in FIG. 7), to pass in an unobstructed manner within general enclosure 58 for engagement with fingers 142 so as to be drawn downwardly beneath feed roll 52 for delivery below and to the pair of scissor rolls (see FIG. 6). It was discovered that the specific configuration of bulkhead 50, including mouth 94 and the respective bottom edge, facilitated passage of rejected articles 20 from chute 48 into the general enclosure without unduly obstructing and clogging entrance chute 44 because articles 20 would otherwise engage in and pile up against bulkhead 50. The presence of bulkhead 50 is needed in order to separate entrance chutes 44 and 46 such that introduction of start-up formed web material into chute 46 does not further obstruct the line-speed delivery of a skeleton web via entrance chute 44. Accordingly, it has been found that multiple entrance openings can be provided with multiple entrance chutes to provide for recycling and comminuting of different webs and rejected articles concurrently, as well as serially, while operating a single comminuting apparatus.

Mouth 94 provides a cleft along a lower edge of bulkhead 50. Alternatively, an opening or aperture can be provided. Further optionally, bulkhead 50 can comprise a baffle plate that is elevated above entrance opening 49.

In operation, bulkhead 50 subdivides an interior of comminuting apparatus 16 (within enclosure 58) such that skeleton web entrance chute 44 is separated from start-up formed web entrance chute 48. Furthermore, an opening or mouth 94 (see FIGS. 2 and 7) is provided in bulkhead 50 such that articles 20 delivered on conveyor 30 through entrance chute 48 do not impinge against bulkhead 50 and become obstructed, but can pass from chute 44 into chute 46 during comminuting of such rejected product (or articles) to facilitate delivery to feed roll 52.

It is understood that bulkhead 50 can be incorporated on any of a number of differently designed comminuting apparatus. One such design shown in the present preferred embodiment includes a feed roll 52 and a pair of intermeshing scissor rolls 54 and 56. Further details of such a construction (but without bulkhead 50 and the entrance openings) have previously been disclosed in U.S. Pat. No. 5,893,523, issued Apr. 13, 1999, entitled "Apparatus for Comminuting Waste Materials Having Feed Roll Delivery Features", naming the inventor as Jere F. Irwin, and herein incorporated by reference. Another suitable alternative construction is disclosed in U.S. Patent Application Publication No. US2002/0190146 A1, entitled "Comminuting Apparatus and Pneumatic Recirculation Systems for Comminuting Apparatus", naming the inventor as Jere F. Irwin, published Dec. 19, 2002, and herein incorporated by reference. Further alternative constructions for comminuting apparatus can also benefit from the incorporation of bulkhead 50 in the features of the present invention.

Figure 2:
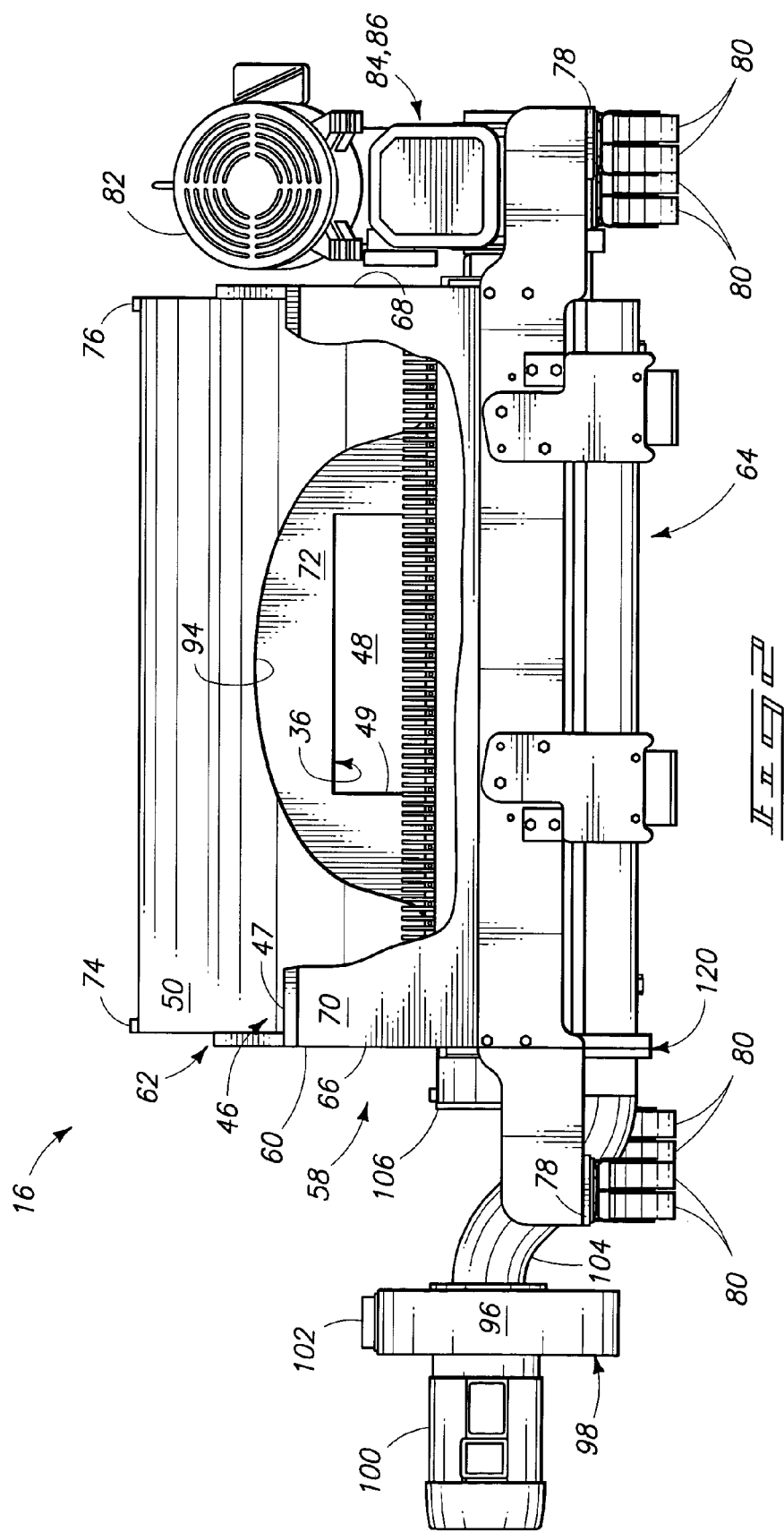
FIG. 2 is a front view of the comminuting apparatus illustrated in FIG. 1 taken from the right.

As shown in FIGS. 2–7, bulkhead 50 is configured between entrance chutes 44 and 46 so as to subdivide an interior of a general enclosure 58 of comminuting apparatus 16. In one case, bulkhead 50 is formed from a piece of formed and zinc-coated sheet steel. Also in one case, bulkhead 50 comprises a baffle that is cambered, or curved, in edge view to facilitate directional entry of waste material from entrances 44 and 46. As shown in FIGS. 2 and 7, a mouth 94 is provided along a bottom edge of bulkhead 50 at a location that enables delivery of rejected articles from entrance chute 48 into the interior of comminuting apparatus 16. This configuration reduces or eliminates jamming or clogging of rejected articles against bulkhead 50. Clogging becomes a consideration, particularly when articles 20 (see FIG. 7) are relatively long and exceed the distance between entrance opening 49 and bulkhead 50.

General enclosure 58 is formed by a general frame 60 which receives a top wall 62, a bottom wall 64, side walls 66 and 68, front wall 70, and back wall 72. Details of such walls are shown respectively in FIGS. 2–5.

In operation, comminuting apparatus 16 is configured to receive solid waste material from one of entrance chutes 44, 46, and 48 (of FIG. 1), with the solid waste material being fed around and beneath feed roll 52 for subdividing beneath and between scissor rolls 54 and 56. Where the solid waste material is delivered via chutes 44, 46, or 48, the solid waste material is delivered out and around feed roll 52 by way of fingers 142 (see FIG. 6).

Depending on a specific application, apparatus 16 may be self-supported beneath a trim press, or affixed to the trim press or packaging table. In the present case, trim press 14 is affixed to packaging table 18 via article conveyor 30 and conveyor cover 36 which are both secured to apparatus 16 using a plurality of fasteners. Alternatively, they can be welded together.

Figure 4:
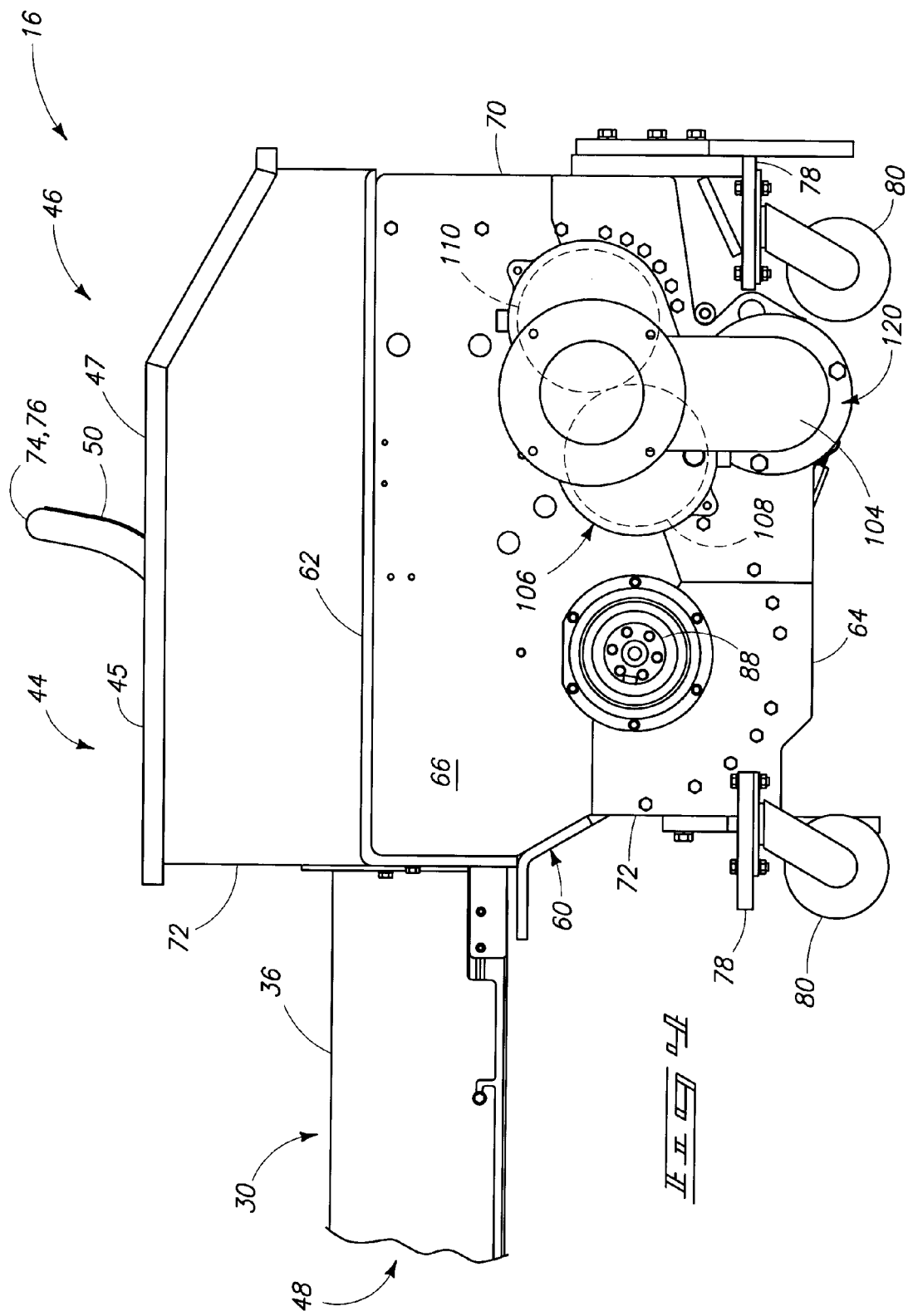
FIG. 4 is a left side view of the apparatus illustrated in FIGS. 1–3, but omitting the pneumatic conveyor and centrifugal fan assembly in order to facilitate viewing of the gear case configuration.

As shown in FIGS. 4 and 5, back wall 72 supports a downstream end of conveyor 30, with conveyor 30 being secured to back wall 72 using a plurality of threaded fasteners. Furthermore, conveyor cover 36 is secured to back wall 72 using such fasteners. Hence, recycle product entrance chute 48 extends through conveyor cover 36 to pass through back wall 72 and into the interior of apparatus 16. As shown in FIG. 2, such entrance chute is defined by a rectangular entrance opening 49 provided in back wall 72.

As shown in FIGS. 2–5, frame 60 of apparatus 16 is supported on four legs 78, each of which has a pair of wheels 80, with one leg 78 provided at each corner of apparatus 16. Frame 60 includes walls 62, 64, 66, 68, 70, and 72, cross-members 122 and 124 (see FIG. 6), and backing plates 128 and 130 (see FIG. 6). Furthermore, in order to support bulkhead 50, a pair of edge frame members 74 and 76 are provided on opposite edges of bulkhead 50 and are welded onto frame 60 by welding members 74 and 76 to side walls 66 and 68, respectively.

As shown in FIG. 6, the pair of scissor rolls 54 and 56 are mounted in an intermeshing relationship for rotation in opposite directions, or co-rotation. Scissor rolls 54 and 56 operate in coordination with each other so as to receive and subdivide solid waste material as it is delivered via feed roll 52 to scissor rolls 54 and 56. More particularly, feed roll 52 includes a plurality of feed fingers 142 that grab and draw solid waste material around and under feed roll 52 for delivery to scissor roll 54. Scissor roll 54 draws the solid waste material underneath, toward and between scissor rolls 54 and 56. Such material is then subdivided as it is drawn from an entrance nip beneath and between scissor rolls 54 and 56 upwardly toward an exit nip between and above scissor rolls 54 and 56. Finger knives 140 on each scissor roll 54 and 56 intermesh and serve to subdivide and comminute the solid waste material. Spacer rings 138 are provided between adjacent scissor rings 136 on each of scissor rolls 54 and 56. By alternating the scissor rings 136 and spacer rings 138 and offsetting them between scissor rolls, intermeshing action occurs between adjacent finger knives 140. A stripper finger 132 and 134 rides along each spacer ring 138 on each scissor roll 54 and 56, respectively, to clean subdivided scrap material from the scissor rolls.

Each stripper finger 132 and 134 is carried by a respective frame cross-member 122 and 124. After material is drawn up between scissor rolls 54 and 56, the material accumulates and cascades over frame cross-member 122 where it is further delivered to feed roll 52 to be further drawn around feed roll 52 and down to scissor roll 54 for further subdividing and/or sorting along separator screen 116.

As material of a sufficiently small size is passed through separator screen 116, such material falls into a shear outtake plenum (or manifold) 118 where it is drawn via an outlet 120 using a pneumatic conveyor 96 (see FIG. 2).

A feed plate 126 includes slots in which each individual finger 142 on feed roll 52 passes so as to meter, punch and draw material along scissor feed roll 52 down along a backing plate 128 and towards scissor roll 54. Backing plate 128 is formed from a plurality of welded pieces of bar stock material that are edge-welded together in order to provide a curved cylindrical shape. Likewise, another backing plate 130 is provided along and beneath scissor roll 56 comprising a plurality of bar stock components that are edge-welded together.

As shown in FIG. 6, a bottom edge of bulkhead 50 is raised elevationally above feed roll 52 a sufficient height such that start-up formed web material that is received within entrance chute 46 can be captured and grabbed by fingers 142 on feed roll 52. The captured scrap material then passes underneath bulkhead 50 and outwardly and downwardly around feed roll 52 for delivery underneath feed roll 52 and towards scissor rolls 54 and 56.

Figure 3:
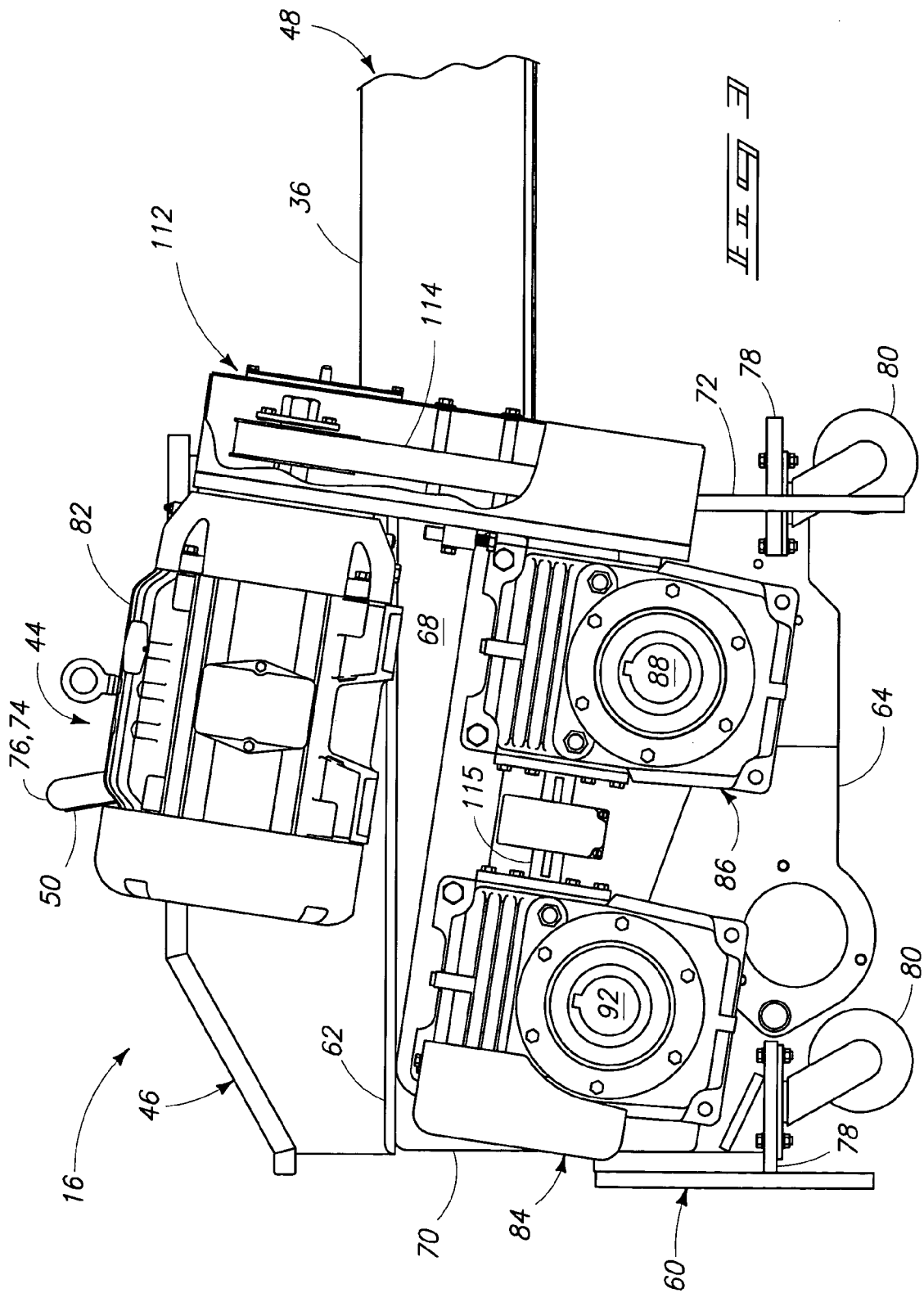
FIG. 3 is a right side view of the apparatus as depicted in FIG. 2 and further shown in FIG. 1.

As shown in FIGS. 2, 3 and 5, an electric drive motor 82 drives a pair of right angle gear boxes 84 and 86 that respectively drive shafts 92 and 88 (see FIG. 3) of scissor roll 56 and feed roll 52, respectively. As shown in FIG. 4, a gear case 106 (beneath the housing) includes a pair of identically sized intermeshing gears 108 and 110 that couple together shafts 90 and 92 of scissor rolls 54 and 56, respectively (see FIG. 6). Accordingly, gears 108 and 110 drive the pair of scissor rolls in co-rotation, but in opposite directions.

In order to withdraw sorted and subdivided plastic waste material from comminuting apparatus 16, pneumatic conveyor 96 is provided externally of enclosure 60. Pneumatic conveyor 96 includes a centrifugal fan 98 that is driven by a constant-speed electric motor 100. A product outlet 102 is provided on a fan housing of centrifugal fan 98 such that materials are withdrawn pneumatically by way of product outlet 120 into an outlet tube (not shown) for collection in a cannister (not shown). Further details of such construction are disclosed in U.S. Pat. No. 5,893,523 and U.S. Patent Application Publication No. US2002/0190146 A1, both previously incorporated by reference. A shear outtake pipe 104 (see FIGS. 2 and 4) draws material from outlet 120 for delivery through pneumatic conveyor 96 and ejection through product outlet 102. Accordingly, pneumatic conveyor 96 generates a vacuum that draws sorted and subdivided material from shear outtake plenum 118, as shown in FIG. 6.

With regard to motor 80, a belt cover (or guard) 112 houses a lugged timing belt 114 which enables motor 82 to drive a shaft 115 that further drives gear boxes 84 and 86 to respectively drive shafts 92 and 88, respectively.

According to one construction, drive motor 82 is a continuous speed drive motor sold by Baldor Electric Company of Fort Smith, Ariz., comprising a four-pole, synchronous, 20 hp, 1800 rpm, 230/460 VAC motor. Also according to one construction, gear boxes 84 and 86 each comprise right angle, worm drive gear boxes having input shafts that are connected using a flexible coupling. In the case of gear box 86, the gear box is a churn gear box having a ratio of 25:1; whereas, the gear box 84 provides the scissor roll gear box having a ratio of 7.5:1. Gear box 86 rotates clockwise; whereas, gear box 84 rotates counter-clockwise, as viewed in FIG. 3.

As shown in FIG. 4, chute 44 originates in an entrance opening 45, whereas chute 46 originates in an entrance opening 47. Similarly, chute 48 corresponds with an entrance opening 49, as shown in FIG. 7. Furthermore, FIG. 7 also illustrates the relative positionings of entrance openings 45, 47 and 49 with respect to chutes 44, 46 and 48, respectively.

FIG. 5 illustrates, in partial breakaway view, entrance chutes 44, 46 and 48. Top wall 62 is shown partially removed in order to view the relative positions of scissor rolls 54 and 56. Frame cross-members 122 and 124 are also shown supporting stripping fingers 132 and 134, respectively. The arrangement of fingers 142 can clearly be seen on feed roll 52. Each finger 142 is received within a respective slot in feed plate 126.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A comminuting device, comprising:
  a support structure having an enclosure;
  a set of intermeshing scissor rolls rotatably carried by the support structure;
  at least two entrance openings provided in the enclosure; and
  a bulkhead interposed between a first one of the entrance openings and a second one of the entrance openings so as to provide a first entrance chute and a second entrance chute, the bulkhead including a mouth portion configured to transfer scrap products between the first entrance chute and the second entrance chute.

2. The comminuting device of claim 1 further comprising a third entrance opening provided along a side of the enclosure and aligned with the mouth portion.

3. The comminuting device of claim 2 further comprising a conveyor duct communicating with the third entrance opening and configured to deliver scrap product into the enclosure with the mouth portion configured to prevent impediment of scrap product from entering the enclosure due to the bulkhead.

4. The comminuting device of claim 1 further comprising a feed roll configured to receive material from at least one of the entrance openings.

5. The comminuting device of claim 1 wherein the scissor rolls are driven in counter-rotation so as to draw waste material beneath and between the scissor rolls from an entrance nip beneath the scissor rolls to an exit nip about the scissor rolls.

6. The comminuting device of claim 1 wherein the bulkhead is supported in a substantially vertical configuration and the mouth portion is provided in a lower, free-edge of the bulkhead.

7. The comminuting device of claim 1 wherein the mouth portion is provided along a lower edge of the bulkhead.

8. The comminuting device of claim 7 wherein the mouth portion includes a cleft provided along a lower edge of the bulkhead.

9. The comminuting device of claim 1 wherein the first and second entrance chutes each extend in a substantially vertical orientation.

10. A plastic shredding machine, comprising:
a frame having an enclosure;
at least two intermeshing scissor rolls rotatably carried by the frame;
at least three entrance openings provided in the enclosure each configure to deliver plastic into the enclosure for shredding between the scissor rolls; and
a baffle plate subdividing the enclosure into a first entrance duct and a second entrance duct and having a clearance mouth intruding on the baffle plate.

11. The plastic shredding machine of claim 10 wherein a first entrance opening communicates with the first entrance duct, a second entrance opening communicates with the second entrance duct, and the clearance mouth is positioned in alignment with the third entrance opening to provide communication between the first entrance duct and the second entrance duct.

12. The plastic shredding machine of claim 11 wherein the first entrance opening is configured to receive a skeleton web from a trim press, the second entrance opening is configured to receive a formed web from a start-up operation, and the third entrance opening is configured to receive rejected articles from the trim press.

13. The plastic shredding machine of claim 10 wherein the baffle plate is substantially vertical and the clearance mouth comprises an arcuate cleft provided along a lower edge of the baffle plate.

14. The plastic shredding machine of claim 10 wherein the first entrance duct and the second entrance duct each have a substantially vertical orientation.

15. The plastic shredding machine of claim 10 further comprising an article conveyor communicating with one of the entrance openings and operative to deliver rejected articles into the shredding machine for comminuting.

16. A plastic shredding machine, comprising:
a frame having an enclosure;
at least two intermeshing scissor rolls rotatably carried by the frame;
at least three entrance opening provided in the enclosure each configured to deliver plastic into the enclosure for shredding between the scissor rolls;
an article conveyor communicating with one of the entrance openings and operative to deliver rejected articles into the shredding machine for comminuting; and
a divider wall provided within the enclosure having an opening centered with the one entrance opening to provide passage of rejected articles through the divider wall.

17. A recycling machine for solid material, comprising:
a frame providing an enclosure;
scissor rolls rotatably carried by the frame;
first and second entrance opening provided in the enclosure;
a divider wall provided in the enclosure to provide at least in part a first entrance duct communicating with the first entrance opening and a second entrance duct communicating with the second entrance opening, and providing a clearance mouth provided along a lower edge of the divider wall between the first entrance duct and the second entrance duct.

18. The recycling machine of claim 17 wherein the clearance mouth comprises an arcuate cleft formed in a lower edge of the divider wall.

19. The recycling machine of claim 17 wherein the divider wall comprises a cambered bulkhead having a contour configured to guide waste material into both the first entrance duct and the second entrance duct.

20. The recycling machine of claim 19 wherein the divider wall is bi-concave.

21. The recycling machine of claim 17 wherein the divider wall comprises a curved bulkhead having a cleft along a bottom edge, wherein the cleft provides the clearance mouth.

22. A recycling machine for solid material, comprising:
a frame providing an enclosure;
scissor rolls rotatably carried by the frame;
first and second entrance opening provided in the enclosure; and
a third entrance opening provided in alignment with the opening in the divider wall and configured to deliver rejected articles into the recycling machine in a manner that prevents the rejected articles from clogging against the divider wall.

23. The recycling machine of claim 22 wherein the divider wall subdivides the enclosure into a skeleton web entrance duct and a formed web entrance duct.

24. The recycling machine of claim 23 wherein the third entrance opening comprises a rejected article entrance duct communicating with the enclosure for delivering rejected articles into the recycling machine for subdividing.

25. The recycling machine of claim 24 further comprising a feed roll provided in the enclosure and configured to draw material from at least one of the ducts for delivery between the plurality of intermeshing scissor rolls.

26. The recycling machine of claim 25 wherein the plurality of scissor rolls comprises a pair of scissor rolls provided adjacent the feed roll and configured to draw waste material from an entrance nip beneath and between the scissor rolls to an exit nip above and between the scissor rolls.

27. The recycling machine of claim 26 further comprising a drive motor configured to drive the feed roll and the pair of scissor rolls.

* * * * *

UNITED STATES PATENT AND TRADEMARK OFFICE
CERTIFICATE OF CORRECTION

| | |
|---|---|
| PATENT NO. | : 7,083,132 B2 |
| APPLICATION NO. | : 10/672528 |
| DATED | : August 1, 2006 |
| INVENTOR(S) | : Jere F. Irwin et al. |

Page 1 of 1

It is certified that error appears in the above-identified patent and that said Letters Patent is hereby corrected as shown below:

Col. 9, line 6, please delete "configure" after "each" and insert --configured--.

Col. 9, line 39, please delete "opening" after "entrance" and insert --openings--.

Col. 9, line 53, please delete "opening" after "entrance" and insert --openings--.

Col. 10, line 25, please delete "opening" after "entrance" and insert --openings--.

Signed and Sealed this

Twenty-fourth Day of April, 2007

JON W. DUDAS
*Director of the United States Patent and Trademark Office*